United States Patent [19]

Deutschenbaur et al.

[11] Patent Number: 4,701,083
[45] Date of Patent: Oct. 20, 1987

[54] TOOL HOLDER FOR DRILLING AND CHISELLING TOOLS

[75] Inventors: Paul Deutschenbaur, Germering; Hans Rupprecht, Munich, both of Fed. Rep. of Germany; Norbert Burtscher, Thüringen, Austria; Berno Nigg, Gamprin, Liechtenstein

[73] Assignee: Hilti Aktiengesellschaft, Fürstentum, Liechtenstein

[21] Appl. No.: 775,612

[22] Filed: Sep. 13, 1985

[30] Foreign Application Priority Data

Sep. 17, 1984 [DE] Fed. Rep. of Germany ....... 3434076

[51] Int. Cl.$^4$ ............................................. B23B 31/12
[52] U.S. Cl. .................................... 408/240; 279/65; 279/82; 279/97; 409/232
[58] Field of Search ...................... 279/76, 77, 78, 79, 279/80, 81, 82, 84, 93, 97, 22, 30, 75; 408/239, 239 A, 240; 409/232, 233

[56] References Cited

U.S. PATENT DOCUMENTS 1,138,465  5/1915  Fegley et al. ..................... 279/82
2,580,930  1/1952  Kost .................................. 279/79
2,731,273  1/1956  Edens ............................... 279/97
3,583,715  6/1971  Jahrl ................................. 279/89

FOREIGN PATENT DOCUMENTS 1106145  5/1961  Fed. Rep. of Germany .
2096045  10/1982  United Kingdom .

Primary Examiner—Z. R. Bilinsky
Attorney, Agent, or Firm—Toren, McGeady & Associates

[57] ABSTRACT

A tool holder for drilling and chiselling tools includes a receiving sleeve forming a bore with a conically shaped section for receiving a conically shaped shank on a drilling or chiselling tool. Shoulders extending in the axial direction of the sleeve are formed on the surface of the conically shaped section for interengagement with grooves in the drilling or chiselling tool shank so that the sleeve can rotate the tool. Locking elements in the form of axially elongated pins are mounted in the receiving sleeve so that the pins extend transversely of the sleeve axis and tangentially of the conically shaped bore section. The pins are spring biased toward the bore section and are displaceable generally radially relative to the bore. The pins are arranged to seat within an annular groove in the shank of the tool.

9 Claims, 4 Drawing Figures

TOOL HOLDER FOR DRILLING AND CHISELLING TOOLS

BACKGROUND OF THE INVENTION

The present invention is directed to a tool holder for drilling and chiselling tools and includes a receiving sleeve forming a bore in which the shank of a tool can be inserted. Spring biased locking elements are located in the sleeve for securing the shank of the inserted tool. Further, axially extending shoulders are formed in the inside surface of the bore for interengagement with grooves in the shank of the tool. The locking elements are arranged to fit into a groove in the shank.

In a known tool holer for securing drilling and chiselling holes, a receiving sleeve is provided with a cylindrically shaped opening or bore for the correspondingly cylindrically shaped shank of the inserted tool. For rotationally driving the tool, shoulders are provided in the opening in the sleeve and they project into grooves in the inserted shank. Further, the tool holder has locking elements in the form of balls or spheres which engage in additional recesses in the inserted shank to hold the inserted tool in the axial direction within the tool holder.

This known tool holder is intended for use in drilling devices where an impact stroke is directed against the tool, such as in a hammer drill. Accordingly, the inserted tools are supported in the tool holder so that they can be axially displaced for a specific dimension. Due to this displaceability and the resultant wear which occurs, a certain amount of radial play exists and leads to a limited radial movement of the tool. Accordingly, this tool holder is not suitable for producing boreholes which are accurate in terms of location and which have precise diameters.

SUMMARY OF THE INVENTION

Therefore, the primary object of the present invention is to provide a tool holder which is simple to operate and assures exact centric guidance of the tools.

In accordance with the present invention, the tool holder is provided with a conically shaped bore section for receiving the shank of the drilling or chiselling tool. The conically shaped surface in the bore converges inwardly from the opening in which the shank is inserted. Locking elements are provided in the conically shaped bore section and they extend tangentially of the surface of the bore section.

Due to the conically shaped bore section, the inserted tools are automatically centered by the surface of the bore section so that the tool is free of any radial play. With the surface of the inserted shank in contact with the surface of the bore section an advantageous sealing action occurs, for example, for use with hollow diamond drill bits for supplying a flushing liquid through the tool holder. The tool shank is rotated by the tool holder by means of shoulders extending inwardly from the surface of the bore section into engagement within grooves in the tool shank. The tool holder can be coded by differently shaped shoulders, for example, for establishing diameter ranges of the tools or other criteria. The axial support of the drilling or chiselling tool is effected by means of radially displaceable pins which extend tangentially of the bore section receiving the shank and engage in recesses in the tool shank.

In contrast to the use of spherical locking elements, elongated pins are characterized by improved resistance to wear and, accordingly, by disturbance-free use. The pins hold the tool shank in constant contact with the wall or surface of the conically shaped bore section by a spring force.

To facilitate the replacement of tools, the cone angle of the conically shaped bore section lies outside the self-locking range. The cone angle of the conically shaped bore section is in the range of 20° to 30° and preferably is 25°. In accordance with another feature of the invention, the support and movement of the pins is effected by tangentially arranged radial slots. Another feature of the radial slots is their inclination, relative to the axis of the receiving sleeve, at an angle in the range 30° to 60° with the slots inclined toward one another in the direction of the opening into the sleeve through which the shank is inserted. Due to this arrangement of the radial slots, the pins can move inwardly and outwardly in a simple manner, that is, by means of applying force in the axial direction of the tool holder.

In a preferred embodiment, an actuating member contacts the pins and the actuating member is acted upon by a spring member. For the sake of simplicity, the actuating member is formed as an annular disc encircling the receiving sleeve and the annular disc contacts the end portions of the pins which project outwardly from the outside surface of the sleeve. As a result, the pins are directed into the engagement position with the tool shank. For disengagement of the pins, another annular disc can be provided also acting on the end portions of the pins in the opposite direction to the actuating member. The pins are disengaged or moved out of contact with the tool shank by displacing this annular disc against the force of the spring element. Such displacement is effected by an axially displaceable actuating sleeve laterally enclosing and spaced radially outwardly from the receiving sleeve.

Another feature of the invention is that the tool shank to be inserted into the tool holder is conically shaped with a cone angle in the range of 20° to 30°. The cooperation of the cone angles of the bore section receiving the shank and of the shank does not lead to any jamming action, since the cone angles lie outside the self-locking range. By providing a corresponding cone angle on the inserted tool shank and on the conically shaped bore section in the tool holder assures a large surface of contact between the inserted shank and the bore section which affords an increased tightness of the connection.

Recesses for the locking elements or pins are preferably in the form of an annular groove because such a construction is advantageous from a production viewpoint.

The flank of the annular groove which is in the leading direction as the shank is inserted into the tool holder is preferably inclined at an angle in the range of 20° to 40° relative to the axis of the tool. The trailing flank of the groove extends at right angles of the tool axis. The groove has a transition section extending between the two flanks. When the shank is inserted the locking elements or pins engage the flank leading in the insertion direction of the tool and hold the shank in continuous contact with the surface of the bore section receiving the tool shank. The tool is prevented, by means of the pins, from being pulled out of the tool holder because of the inclined relation between the radial slots and the flank of the annular groove leading in the insertion direction. The tool is released for removal when the pins are displaced radially outwardly and disengaged from the annular groove by pulling back on the actuating sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
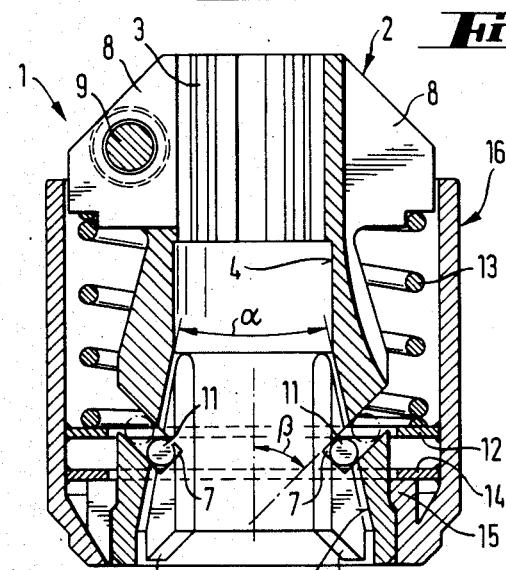
FIG. 1 is an axially extending section of a tool holder embodying the present invention.

In FIG. 1 a tool holder 1 includes an axially extending receiving sleeve 2. As viewed in FIG. 1 the lower end of the sleeve is the leading end into which a drilling or chiselling tool shank can be inserted and the upper end is the trailing end into which the spindle of the drive device can be inserted. A bore extends through the sleeve from the leading end to the trailing end. The section of the bore extending from the trailing end is provided with a spline connection 3 with the leading end of the spline connection opening into a cylindrically shaped bore section 4 and the bore section 4 opening at its leading end into a conically shaped bore section 5 having a cone angle $\alpha$ of 25°. Projecting inwardly from the surface of the conically shaped bore section 5 and extending in the axial direction of the receiving sleeve are three shoulders 6 which are spaced equiangularly apart around the bore section, note FIG. 2. The conically shaped bore section 5 of the receiving sleeve 2 has radially directed slots 7 extending tangentially relative to the surface of the bore section 5 and extending through the outer surface of the receiving sleeve. The slots 7 are inclined in the radial direction at an angle $\beta$ of 45° with respect to the axis of the receiving sleeve 2. The angle of the slots 7 is directed toward the trailing end of the sleeve. Extending from its trailing end, the sleeve has an axially extending slot 8 which affords a certain amount of elasticity to the trailing end portion of the sleeve. A bolt 9 is provided through the sleeve outwardly from the bore so that the end of the sleeve can be tightened on the drive spindle of a drive device by tightening the bolt.

Figure 2:
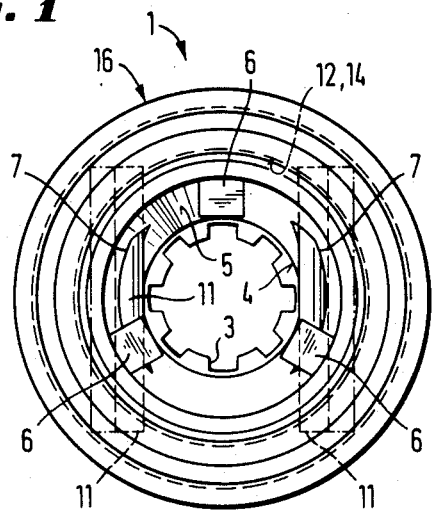
FIG. 2 is an end view of the tool holder shown in the direction of the arrows II—II in FIG. 1.

Locking elements or axially elongated pins 11 are positioned in the radial slots 7. As can be seen in FIG. 2, the opposite ends of the pins project outwardly from the outside surface of the receiving sleeve 2. An annular disc-like actuating element 12 is located radially outwardly from the sleeve 2 and contacts the opposite end portions of the pins 11. A spring element 13 encircles the receiving sleeve 2 and bears against the actuating element 12 and the trailing end portion of the sleeve for biasing the actuating element against the pins.

In addition, an annular disc 14 is spaced toward the leading end of the sleeve from the actuating element 12 and is located on the opposite side of the pins from the actuating element. In the unoccupied condition of the tool holer 1, as shown in FIG. 1, the annular disc 14 is supported against a support rim 15 within an actuating sleeve 16. The sleeve extends from the leading end of the receiving sleeve 2 toward the trailing end. The actuating sleeve 16 is axially displaceable relative to the receiving sleeve so that it can be moved from the position shown in FIG. 1 toward the trailing end of the sleeve.

In FIG. 2 the arrangement of the shoulders 6 within the receiving sleeve 2 is illustrated. Further, it can be seen how the ends of the pins 11 project outwardly from the outer surface of the receiving sleeve 2.

Figure 3:
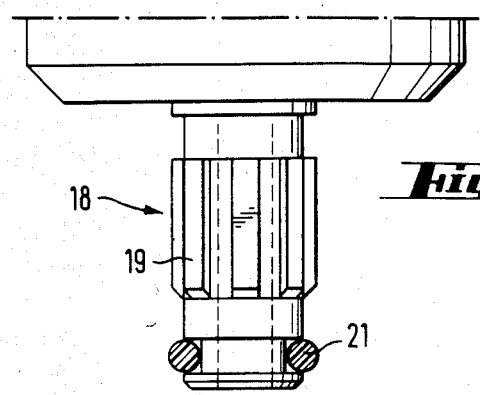
FIG. 3 is an elevational view of the spindle of a driving device for engagement in the tool holder.

In FIG. 3 a drive spindle 18 of a drive device is depicted. Drive spindle 18 has a spline connection 19 for engagement with the spline connection 3 in the trailing end section of the bore through the receiving sleeve. The splined interconnection of the spindle 18 and the tool holder 1 effects the rotation of the tool holder. In addition, an elastic sealing ring 21 extends around the lower end of the spindle 18 as shown in FIG. 3.

To connect the tool holder 1 with the spindle 18, the holder is placed onto the spindle until the sealing ring 21 catches in the cylindrical bore section 4 in the sleeve. At the same time, the splined connections 3, 19 on the receiving sleeve 2 and the drive spindle 18 connect the two parts so that they can rotate together. By tightening the bolt 9 the two parts are secured against any relative axial displacement.

Figure 4:
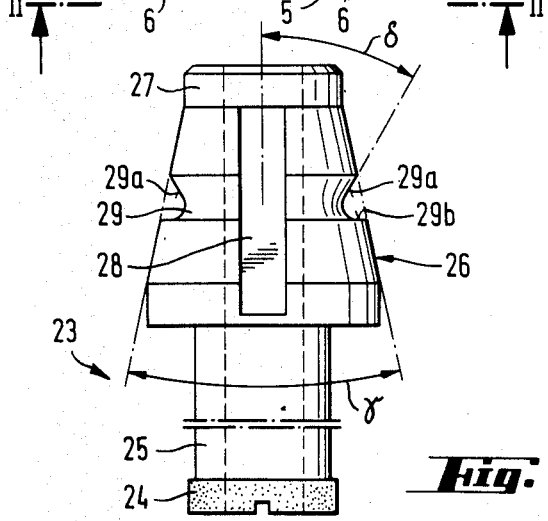
FIG. 4 illustrates a tool with the shank arranged to be inserted into the tool holder illustrated in FIG. 1.

In FIG. 4 a tool 23 in the form of a hollow drill is displayed. Tool 23 has a drilling head 24 at its leading end, that is the end which extends outwardly from the holder, provided with diamond grains. Extending from the drilling head 24 is an axially elongated shaft 25 shown only in part. A conically shaped shank 26 extends from the trailing end of the shaft 25 to be inserted into the bore section 5 of the receiving sleeve 2 in the tool holder 1. The larger diameter end of the shank 26 extends radially outwardly from the shaft 25 and has a conically shaped axially extending surface corresponding substantially with the conically shaped surface in the bore section 5, that is, it has a cone angle $\gamma$ of 25°. At the smaller diameter end of tahe shank 26 a cylindrically shaped end portion 27 is arranged having a diameter corresponding to the diameter of the cylindrically shaped bore section 4 in the receiving sleeve 2. Extending in the axial direction in the conically shaped surface of the shank 26 are three grooves 28 equiangularly spaced apart for effecting form-locking engagement with the shoulders 6 projecting inwardly in the bore section 5 of the receiving sleeve. Further, an annular groove 29 is formed in the conically shaped surface of the shank 26 intermediate the ends of the surface. The surface of the annular groove is formed by a flank 29a closer to the smaller diameter end of the conically shaped surface and a flank 29b closer to the larger diameter end of the conically shaped surface. The groove has a transition section extending between the two flanks 29a and 29b. Flank 29a is inclined relative to the tool axis at an angle $\delta$ of 30°, while the other flank 29b extends substantially at a right angle relative to the tool axis.

For the insertion of the tool 23 into the leading end of the tool holder 1, the end of the shank 26 is guided against the leading end of the shoulders 6. By rotating the tool the grooves 28 in the shank register with the shoulders 6 in the bore section 5 of the tool holder and the tool 23 can then be inserted fully into the bore section 5 first pressing the pins 11 outwardly into the radial slot 7 against the spring force acting on the pins. As the shank completes its movement into the receiving sleeve 2, the annular groove 29 is aligned opposite the openings of the radial slots 7 in the inside surface of the bore section 5 so that the pins move into the annular groove due to the biasing action afforded by the spring element 13 and the actuating element 12. The pins 11 bear against the flank 29a on the portion of the groove 29 closer to the smaller diameter end of the tool shank and effect a force component which ensures automatic contact of the conically shaped surface of the shank 26 with the conically shaped surface of the bore section 5.

To remove the tool 23, the actuating sleeve 16 is displaced manually so that it moves toward the trailing end of the receiving sleeve 2. During such movement, the annular disc 14, in contact with the pins 11, displaces the pins outwardly through the radial slot unitl they are removed from the annular groove 29. With the pins 11 released from engagement with the annular groove 29, the tool 23 can be pulled out of the tool holder 1 without any noticeable expenditure of force.

While specific embodiments of the invention have been shown and described in detail to illustrate the application of the inventive principles, it will be understood that the invention may be embodied otherwise without departing from such principles.

We claim:

1. Tool holder for drilling and chiselling tools comprising an axially extending receiving sleeve having a first end and a second end spaced apart in the axial direction and a bore formed by said sleeve and extending in the axial direction therethrough, said bore having a first axially extending bore section extending from the first end toward the second end, and a second axially extending bore section extending from said second end toward said first end, said first bore section arranged to receive a shank of a drilling or chiselling tool and said second bore section arranged to receive a drive spindle of a drive device, spring biased locking elements located in said receiving sleeve within said first bore section, said first bore section has inwardly projecting axially extending shoulders therein arranged to interfit with correspondingly shaped grooves on the shank of a drilling or chiselling tool, said locking elements are arranged to fit into recesses in the shank of a drilling or chiselling tool, wherein the improvement comprises that said first bore section has an axially extending conically shaped inner surface with the diameter thereof reducing from the first end toward the second end of said receiving sleeve and a radially outer surface, said shoulders project in the axial direction radially inwardly from said conically shaped inner surface and are spaced equiangularly apart around said conically shaped surface, and said locking elements are axially elongated pins extending transversely of the axial direction of said receiving sleeve and extending generally tangentially of said first bore section, each of said pins has a pair of opposite ends spaced apart in the axial direction of said pins, the opposite ends of said pins remain spaced radially outwardly from said conically shaped inner surface and extend outwardly of said radially outer surface, means located outwardly from said radially outer surface and in contact with the opposite ends of said pins for spring biasing said pins intermediate the opposite ends thereof radially outwardly of said conically shaped inner surface so that intermediate the opposite ends said pins are arranged to engage in the grooves on the shank of the drilling or chiselling tool to be secured in said tool holder.

2. Tool holder, as set forth in claim 1, wherein the cone angle of said first axially extending bore section is in the range of 20° to 30°.

3. Tool holder, as set forth in claim 1, wherein the cone angle of said first axially extending bore section being 25°.

4. Tool holder, as set forth in claim 1, 2 or 3, wherein radially extending slots extend through said receiving sleeve in the region of said first axially extending bore section from the radially outer surface to the radially inner surface with the radially inner end of said slots extending tangentially of the surface of the first axially extending bore section, and said pins intermediate the opposite ends thereof are located in said slots.

5. Tool holder, as set forth in claim 4, wherein said radially extending slots are inclined at an angle in the range of 30° to 60° relative to the axis of said receiving sleeve and are inclined outwardly from the axis of said receiving sleeve toward the second end thereof.

6. Tool holder, as set forth in claim 5, wherein said pins at the opposite ends thereof project outwardly from the radially outer surface of said receiving sleeve, said spring biasing means comprises an actuating element located outwardly from said receiving sleeve and disposed in contact with the opposite ends of said pins, and a spring element acting on said actuating element and biasing said pins radially inwardly within said radial slots.

7. Tool holder, as set forth in claim 1, 2 or 3, including a tool for insertion into said tool holder, said tool being axially elongated and having a first end arranged to be inserted into the first end of said receiving sleeve, said first end of said tool having an axially extending conically shaped shank having a cone angle in the range of 20° to 30°.

8. Tool holder, as set forth in claim 7, wherein said conically shaped shank of said tool has an annular groove extending transversely of the axis thereof and said annular groove forms the recesses for said pins.

9. Tool holder, as set forth in claim 8, wherein said annular groove has a first flank closer to the first end of said tool with said flank inclined at an angle of 20° to 40° relative to the tool axis and said annular groove has a second flank more remote from the first end of said tool than said first flank with said second flank extending at a right angle to said tool axis.

* * * * *